(12) United States Patent
Kuo et al.

(10) Patent No.: US 12,039,015 B2
(45) Date of Patent: Jul. 16, 2024

(54) METHOD FOR DETECTING DEFECTS IN MULTI-SCALE IMAGES AND COMPUTING DEVICE UTILIZING METHOD

(71) Applicant: HON HAI PRECISION INDUSTRY CO., LTD., New Taipei (TW)

(72) Inventors: Chin-Pin Kuo, New Taipei (TW); Shih-Chao Chien, New Taipei (TW); Tung-Tso Tsai, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 473 days.

(21) Appl. No.: 17/526,290

(22) Filed: Nov. 15, 2021

(65) Prior Publication Data
US 2022/0198228 A1 Jun. 23, 2022

(30) Foreign Application Priority Data
Dec. 22, 2020 (CN) ......................... 202011527501.7

(51) Int. Cl.
G06K 9/62 (2022.01)
G06F 18/214 (2023.01)
(Continued)

(52) U.S. Cl.
CPC ...... *G06F 18/2415* (2023.01); *G06F 18/2155* (2023.01); *G06N 3/045* (2023.01);
(Continued)

(58) Field of Classification Search
None
See application file for complete search history.

(56) References Cited

U.S. PATENT DOCUMENTS

| | | | |
|---|---|---|---|
| 7,171,038 B2* | 1/2007 | Adler | G03F 7/7065 250/307 |
| 9,170,503 B2* | 10/2015 | Adler | G01N 23/2252 |
| 9,529,279 B2* | 12/2016 | Adler | G01N 21/95607 |
| 10,109,045 B2* | 10/2018 | Kobayashi | G01N 21/8901 |
| 10,275,894 B2* | 4/2019 | Saini | G06T 7/0004 |

(Continued)

FOREIGN PATENT DOCUMENTS

| | | |
|---|---|---|
| CN | 111507974 | 8/2020 |
| CN | 111833306 | 10/2020 |

OTHER PUBLICATIONS

Lv et al., "A Novel Pixel-Wise Defect Inspection Method Based on Stable Background Reconstruction," in IEEE Transactions on Instrumentation and Measurement, vol. 70, pp. 1-13, 2021 (published in Nov. 2020) (Year: 2020).*

*Primary Examiner* — Feng Niu
(74) *Attorney, Agent, or Firm* — ScienBiziP, P.C.

(57) ABSTRACT

A method for detecting defects in multi-scale images and a computing device applying the method acquires a to-be-detected image and converts the to-be-detected image into a plurality of target images of preset sizes. Feature extraction is performed on each target image by using a pre-trained encoder to obtain a latent vector, the latent vector of each target image is inputted into a decoder corresponding to the encoder to obtain a reconstructed image and then into a pre-trained Gaussian mixture model to obtain an estimated probability. Reconstruction error is calculated according to each target image and the corresponding reconstructed image. A total error is calculated according to the reconstruction error of each target image and the corresponding estimated probability, and a detection result is determined according to the total error of each target image and a corresponding preset threshold, thereby improving an accuracy of defect detection.

20 Claims, 2 Drawing Sheets

(51) Int. Cl.
*G06F 18/2415* (2023.01)
*G06N 3/045* (2023.01)
*G06N 3/047* (2023.01)
*G06N 3/08* (2023.01)
*G06N 7/01* (2023.01)
*G06T 7/00* (2017.01)

(52) U.S. Cl.
CPC ............... *G06N 3/047* (2023.01); *G06N 3/08* (2013.01); *G06N 7/01* (2023.01); *G06T 7/0004* (2013.01); *G06T 2207/10004* (2013.01); *G06T 2207/20016* (2013.01); *G06T 2207/20076* (2013.01); *G06T 2207/20081* (2013.01); *G06T 2207/20084* (2013.01); *G06T 2207/30108* (2013.01)

(56) References Cited

U.S. PATENT DOCUMENTS

| | | | |
|---|---|---|---|
| 11,276,162 B2* | 3/2022 | Chaton | G06V 10/30 |
| 11,830,991 B2* | 11/2023 | Kwon | H01M 10/486 |
| 2002/0161534 A1* | 10/2002 | Adler | G03F 7/70616 |
| | | | 702/35 |
| 2007/0025610 A1* | 2/2007 | Adler | G01N 23/2251 |
| | | | 382/149 |
| 2007/0230768 A1* | 10/2007 | Adler | H01J 37/244 |
| | | | 382/141 |
| 2017/0011502 A1* | 1/2017 | Kobayashi | G06T 7/41 |
| 2017/0074810 A1* | 3/2017 | Adler | G03F 1/84 |
| 2017/0223383 A1* | 8/2017 | Saini | G06T 7/0004 |
| 2018/0330494 A1* | 11/2018 | Tanaka | G06T 7/0004 |
| 2020/0364842 A1* | 11/2020 | Chaton | G06T 7/001 |
| 2022/0035256 A1* | 2/2022 | Zhang | G03F 7/7085 |

* cited by examiner

METHOD FOR DETECTING DEFECTS IN MULTI-SCALE IMAGES AND COMPUTING DEVICE UTILIZING METHOD

FIELD

The present disclosure relates to a technical field of quality control in manufacturing, specifically a method for detecting defects in multi-scale images, a computing device and a storage medium.

BACKGROUND

In order to improve qualities of industrial products, the industrial products should be inspected for defects before they are packaged. Due to variation of defects in different scales of view, traditional defect detection methods cannot cover the variation of defects in different scales, thereby reducing the accuracy of defect detection.

DETAILED DESCRIPTION

The accompanying drawings combined with the detailed description illustrate the embodiments of the present disclosure hereinafter. It is noted that embodiments of the present disclosure and features of the embodiments can be combined, when there is no conflict.

Various details are described in the following descriptions for a better understanding of the present disclosure, however, the present disclosure may also be implemented in ways other than those described herein. The scope of the present disclosure is not to be limited by the specific embodiments disclosed below.

Unless defined otherwise, all technical and scientific terms used herein have the same meaning as commonly understood by one of ordinary skill in the art to which the present disclosure belongs. The terms used herein in the present disclosure are only for the purpose of describing specific embodiments and are not intended to limit the present disclosure.

Optionally, the method for detecting defects in multi-scale images of the present disclosure can be applied to one or more computing devices. The computing device includes hardware such as, but not limited to, a microprocessor and an Application Specific Integrated Circuit (ASIC), Field-Programmable Gate Array (FPGA), Digital Signal Processor (DSP), embedded devices, etc.

The computing device may be a device such as a desktop computer, a notebook, a palmtop computer, or a cloud server. The computing device can interact with users through a keyboard, a mouse, a remote control, a touch panel, or a voice control device.

Figure 1:
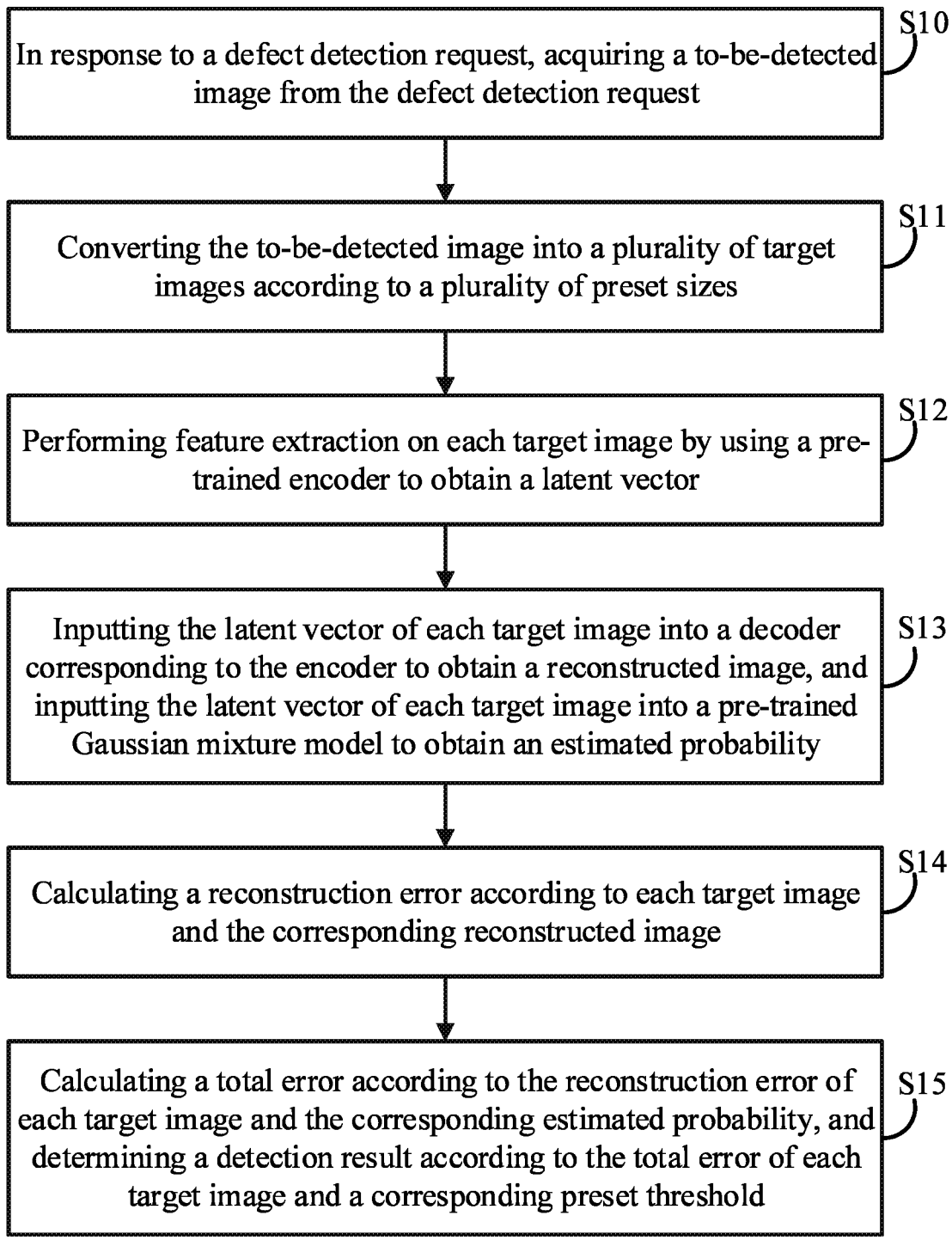
FIG. 1 shows a flowchart of a method for detecting defects in multi-scale images provided in an embodiment of the present disclosure.

FIG. 1 is a flowchart of a method for detecting defects in multi-scale images in an embodiment of the present disclosure. The method for detecting defects in multi-scale images is applied to computing devices. According to different needs, the order of the steps in the flowchart can be changed, and some can be omitted.

In block S10, in response to a defect detection request, acquiring a to-be-detected image from the defect detection request.

In at least one embodiment of the present disclosure, the defect detection request can be triggered by a user (for example, triggered by touching a preset function button), or can be triggered automatically at preset times, which is not limited.

The preset time may be a time point (for example, nine o'clock in the morning every day), or the beginning of a period of time.

In at least one embodiment of the present disclosure, information carried in the defect detection request includes, but is not limited to, the to-be-detected image. The to-be-detected image is an image of a target object.

In at least one embodiment of the present disclosure, wherein the acquiring of a to-be-detected image from the defect detection request includes: obtaining an idle thread from a preset thread connection pool; parsing a method body of the defect detection request through the idle thread and obtaining a plurality of information carried in the defect detection request; acquiring a preset label, and extracting information corresponding to the preset label from the plurality of information as to the to-be-detected image.

The preset thread connection pool stores a plurality of threads. The preset label refers to a pre-defined label, for example, the preset label may be a name, which is used to identify the to-be-detected image.

By obtaining the idle thread from the thread connection pool, thread creation time can be saved, and by parsing the method body of the defect detection request, the time of parsing the defect detection request can be shortened, thereby improving the parsing efficiency. A mapping between the preset label and the to-be-detected image enables the to-be-detected image to be accurately determined.

In block S11, converting the to-be-detected image into a plurality of target images according to a plurality of preset sizes.

In at least one embodiment of the present disclosure, the plurality of preset sizes may include, but are not limited to: 32*32, 64*64, 128*128. The number of the plurality of preset sizes is the same as the number of the plurality of images.

In at least one embodiment of the present disclosure, the computing device converting the to-be-detected image into a plurality of target images according to a plurality of preset size includes: detecting a target object in the to-be-detected image; segmenting an area corresponding to the target object and obtaining an area image; converting the area image according to the plurality of preset sizes and obtaining the plurality of target images.

This ensures that the area image merely contains the detectable object. Since a size of the area image containing the detection object is smaller than a size of the to-be-detected image, the size conversion of the area image improves an efficiency of image conversion.

The computing device may use an open source OpenCV tool to convert the area image into the plurality of target images.

In block S12, performing feature extraction on each target image by using a pre-trained encoder to obtain a latent vector.

In at least one embodiment of the present disclosure, the encoder may be an encoder in an autoencoder. The encoder includes a plurality of hidden layers (that is, non-visible layers), and number of hidden layers can be arbitrarily set.

In at least one embodiment of the present disclosure, the method of performing feature extraction on each target image by using a pre-trained encoder to obtain a latent vector includes: performing an encoding process on each target image and obtaining a feature vector; calculating the feature vector through a plurality of hidden layers of the encoder; and determining an output vector of final hidden layer as the latent vector.

In at least one embodiment of the present disclosure, the method of calculating each feature vector through the plurality of hidden layers of the encoder includes: acquiring a weighting matrix and an offset value of any hidden layer; multiplying the feature vector and the weighting matrix to obtain a first operation result; and adding the first operation result and the offset value to obtain an output vector of the any hidden layer.

In block S13, inputting the latent vector of each target image into a decoder corresponding to the encoder to obtain a reconstructed image, and inputting the latent vector of each target image into a pre-trained Gaussian mixture model to obtain an estimated probability.

In at least one embodiment of the present disclosure, the decoder may be a decoder in the autoencoder. The decoder includes calculation layers which correspond to the hidden layers in the encoder. The number of the calculation layers is the same as the number of the hidden layers.

In at least one embodiment of the present disclosure, the Gaussian mixture model (GMM) can accurately quantify the latent vectors using a Gaussian probability density function (normal distribution curve).

In at least one embodiment of the present disclosure, before inputting the latent vector of each target image into a pre-trained Gaussian mixture model, the method for detecting defects in multi-scale images further includes: acquiring a plurality of training images; encoding the plurality of training images to obtain a plurality of coding vectors; performing a dimensionality reduction and a normalization processing on the plurality of coding vectors to obtain a plurality of low-dimensional vectors; dividing the plurality of low-dimensional vectors into a training set, a test set, and a verification set; based on a maximum expectation algorithm, iteratively training the training set to obtain a learner; testing the learner with the test set to obtain a test result; if the test result is less than a configured value, optimizing parameters of the learner with the verification set to obtain the Gaussian mixture model.

By the above procedure, the Gaussian mixture model has better performance.

In at least one embodiment, before dividing the plurality of low-dimensional vectors into a training set, a test set, and a verification set, the method further includes: calculating a number of the plurality of low-dimensional vectors, determining whether the number is less than a preset number threshold, and when the number is less than the preset number threshold, increasing the number of the plurality of low-dimensional vectors by using a data enhancement algorithm.

Through the above embodiment, it is possible to avoid a poor generalization ability of the estimated probability generated by the Gaussian mixture model obtained by training due to an insufficient number of the plurality of low-dimensional vectors.

In at least one embodiment of the present application, the method of dividing the plurality of low-dimensional vectors into a training set, a test set, and a verification set includes: randomly dividing the plurality of low-dimensional vectors into a plurality of data packets according to a preset ratio, selecting, from the plurality of data packets, a data packet as the verification set, and a data packet as the test set; determining the remaining data packets as being the training set, and repeating the above steps until all the data packets are used as the verification set in turn.

The preset ratio can be customized, which is not limited in this application.

Through the above embodiment, each low-dimensional vector of the plurality of low-dimensional vectors is involved in training and verification, thereby improving a fitness of the Gaussian mixture model.

In block S14, calculating a reconstruction error according to each target image and the corresponding reconstructed image.

In at least one embodiment, the method of calculating a total error according to the reconstruction error of the target image and the corresponding estimated probability includes: acquiring pixels in the reconstructed image as first pixels, and calculating a first number of the first pixels; acquiring pixels in the target image as second pixels; comparing each first pixel with the corresponding second pixel; determining pixels in the first pixels that are different from the corresponding second pixel as target pixels; calculating a second number of the target pixels; dividing the second number by the first number and obtaining the reconstruction error.

Through the above embodiments, the reconstruction error of each target image can be accurately calculated.

In block S15, calculating a total error according to the reconstruction error of each target image and the corresponding estimated probability, and determining a detection result according to the total error of each target image and a corresponding preset threshold.

In at least one embodiment, the detection result can include flaws being found in the to-be-detected image and no flaws being found in the to-be-detected image.

In at least one embodiment, wherein calculating a total error according to the reconstruction error of each target image and the corresponding estimated probability includes: obtaining a preset first weighting corresponding to the estimated probability; obtaining a preset second weighting corresponding to the reconstruction error; multiplying each estimated probability by the preset first weighting to obtain a first value; multiplying each reconstruction error by the preset second weighting to obtain a second value; adding the first value and the second value to obtain the total error.

A sum of the preset first weighting and the preset second weighting is 1.

Through the above embodiment, the total error of each target image can be quickly calculated.

In at least one embodiment, wherein determining a detection result according to the total error of each target image and a corresponding preset threshold includes: determining a minimum preset threshold from a plurality of the preset thresholds; if each total error is less than the minimum preset threshold, determining the detection result as flawless being found in the to-be-detected image; if any total error is greater than or equal to the corresponding preset threshold, determining the detection result as flaws being found in the to-be-detected image; if each total error is less than the corresponding preset threshold, but any total error is greater than or equal to the minimum preset threshold, determining the detection result as flaws being found in the to-be-detected image.

In at least one embodiment, when the to-be-detected image reveals a defect, the computing device generates reminder information according to the to-be-detected image, and sends the reminder information to a terminal device of a designated contact.

By performing size conversion on the to-be-detected image, changes in types of defects at various scales can be covered, and an accuracy of defect detection can be improved.

Figure 2:
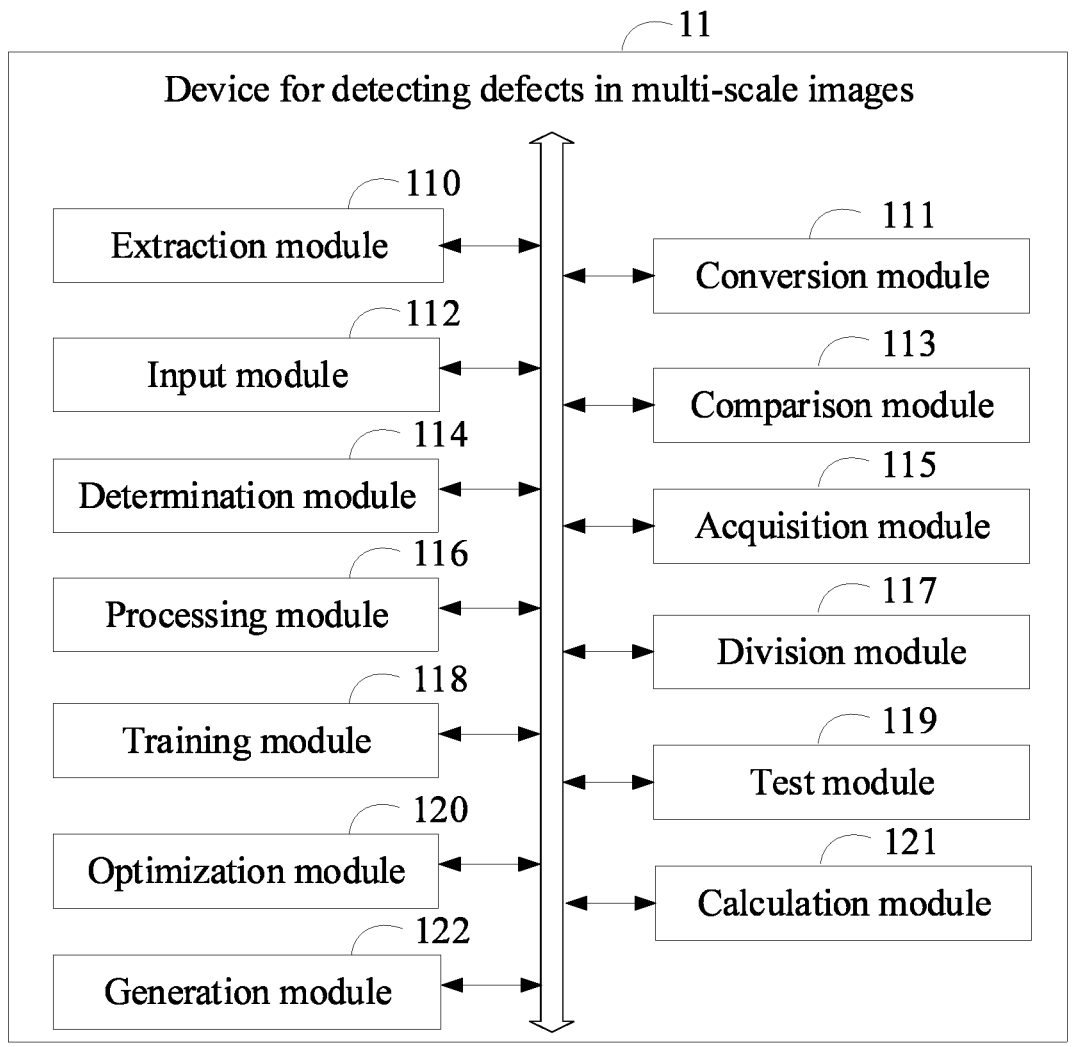
FIG. 2 shows a schematic structural diagram of a device for detecting defects in multi-scale images provided in an embodiment of the present disclosure.

FIG. 2 shows a device for detecting defects in multi-scale images provided in the embodiment of the present disclosure.

In some embodiments, the device for detecting defects in multi-scale images 11 runs in a computing device. The device for detecting defects in multi-scale images 11 can include a plurality of function modules consisting of program code segments. The program code of each program code segments in the device for detecting defects in multi-scale images 11 can be stored in a memory and executed by at least one processor to perform detecting defects in multi-scale images (described in detail in FIG. 2).

As shown in FIG. 2, the device for detecting defects in multi-scale images 11 can include: an extraction module 110, a conversion module 111, an input module 112, a comparison module 113, a determination module 114, an acquisition module 115, a processing module 116, a division module 117, a training module 118, a test module 119, an optimization module 120, a calculation module 121, and a generation module 122. A module as referred to in the present disclosure refers to a series of computer-readable instruction segments that can be executed by at least one processor and that are capable of performing fixed functions, which are stored in a memory. In some embodiment, the functions of each module will be detailed.

The above-mentioned integrated module implemented in a form of software functional modules can be stored in a non-transitory readable storage medium. The above software function modules are stored in a storage medium and include several instructions for causing a computing device (which can be a personal computer, a dual-screen device, or a network device) or a processor to execute the method described in various embodiments in the present disclosure.

In response to a defect detection request, the extraction module 110 acquires a to-be-detected image from the defect detection request.

In at least one embodiment of the present disclosure, the defect detection request can be triggered by a user (for example, triggered by touching a preset function button), or can be triggered automatically at preset times, which is not limited.

The preset time may be a time point (for example, nine o'clock in the morning every day), or the beginning of a period of time.

In at least one embodiment of the present disclosure, information carried in the defect detection request includes, but is not limited to, the to-be-detected image. The to-be-detected image is an image of a target object.

In at least one embodiment of the present disclosure, the extraction module 110 acquiring a to-be-detected image from the defect detection request includes: obtaining an idle thread from a preset thread connection pool; parsing a method body of the defect detection request through the idle thread and obtaining a plurality of information carried in the defect detection request; acquiring a preset label, and extracting information corresponding to the preset label from the plurality of information as to the to-be-detected image.

The preset thread connection pool stores a plurality of threads. The preset label refers to a pre-defined label, for example, the preset label may be a name, which is used to identify the to-be-detected image.

By obtaining the idle thread from the thread connection pool, thread creation time can be saved, and by parsing the method body of the defect detection request, the time of parsing the defect detection request can be shortened, thereby improving the parsing efficiency. A mapping between the preset label and the to-be-detected image enables the to-be-detected image to be accurately determined.

The conversion module 111 converts the to-be-detected image into a plurality of target images according to a plurality of preset sizes.

In at least one embodiment of the present disclosure, the plurality of preset sizes may include, but are not limited to: 32*32, 64*64, 128*128. The number of the plurality of preset sizes is the same as the number of the plurality of images.

In at least one embodiment of the present disclosure, the conversion module 111 converting the to-be-detected image into a plurality of target images according to a plurality of preset size includes: detecting a target object in the to-be-detected image; segmenting an area corresponding to the target object and obtaining an area image; converting the area image according to the plurality of preset sizes and obtaining the plurality of target images.

This ensures that the area image merely contains the detectable object. Since a size of the area image containing the detection object is smaller than a size of the to-be-detected image, the size conversion of the area image improves an efficiency of image conversion.

The conversion module 111 may use an open source OpenCV tool to convert the area image into the plurality of target images.

The extraction module 110 performs feature extraction on each target image by using a pre-trained encoder to obtain a latent vector.

In at least one embodiment of the present disclosure, the encoder may be an encoder in an autoencoder. The encoder includes a plurality of hidden layers (that is, non-visible layers), and number of hidden layers can be arbitrarily set.

In at least one embodiment of the present disclosure, the extraction module 110 performing feature extraction on each target image by using a pre-trained encoder to obtain a latent vector includes: performing an encoding process on each target image and obtaining a feature vector; calculating the feature vector through a plurality of hidden layers of the encoder; and determining an output vector of a final hidden layer as the latent vector.

In at least one embodiment of the present disclosure, the method of calculating each feature vector through the plurality of hidden layers of the encoder includes: acquiring a weightings matrix and an offset value of any hidden layer; multiplying the feature vector and the weighting matrix to obtain a first operation result; and adding the first operation result and the offset value to obtain an output vector of the any hidden layer.

The input module 112 inputs the latent vector of each target image into a decoder corresponding to the encoder to obtain a reconstructed image, and inputs the latent vector of each target image into a pre-trained Gaussian mixture model to obtain an estimated probability.

In at least one embodiment of the present disclosure, the decoder may be a decoder in the autoencoder. The decoder includes calculation layers which correspond to the hidden layers in the encoder. The number of the calculation layers is the same as the number of the hidden layers.

In at least one embodiment of the present disclosure, the Gaussian mixture model (GMM) can accurately quantify the latent vectors using a Gaussian probability density function (normal distribution curve).

In at least one embodiment of the present disclosure, before inputting the latent vector of each target image into a pre-trained Gaussian mixture model, the acquisition module 115 acquires a plurality of training images; the processing module 116 encodes the plurality of training images to obtain a plurality of coding vectors and performs a dimensionality reduction and a normalization process on the plurality of coding vectors to obtain a plurality of low-dimensional vectors; the division module 117 divides the plurality of low-dimensional vectors into a training set, a test set, and a verification set; the training module 118, based on a maximum expectation algorithm, iteratively trains the training set to obtain a learner; the test module 119 tests the learner with the test set to obtain a test result; if the test result is less than a configured value, the optimization module 120 optimizes parameters of the learner with the verification set to obtain the Gaussian mixture model.

By the above procedure, the Gaussian mixture model has better performance.

In at least one embodiment, before dividing the plurality of low-dimensional vectors into a training set, a test set, and a verification set, the calculation module 121 calculates a number of the plurality of low-dimensional vectors, determines whether the number is less than a preset number threshold, and when the number is less than the preset number threshold, increases the number of the plurality of low-dimensional vectors by using a data enhancement algorithm.

Through the above embodiment, it is possible to avoid a poor generalization ability of the estimated probability generated by the Gaussian mixture model obtained by training due to an insufficient number of the plurality of low-dimensional vectors.

In at least one embodiment of the present application, the division module 117 dividing the plurality of low-dimensional vectors into a training set, a test set, and a verification set includes: randomly dividing the plurality of low-dimensional vectors into a plurality of data packets according to a preset ratio, selecting, from the plurality of data packets, a data packet as the verification set, and a data packet as the test set; determining the remaining data packets as being the training set, and repeating the above steps until all the data packets are used as the verification set in turn.

The preset ratio can be customized, which is not limited in this application.

Through the above embodiment, each low-dimensional vector of the plurality of low-dimensional vectors is involved in training and verification, thereby improving a fitness of the Gaussian mixture model.

The comparison module 113 calculates a reconstruction error according to each target image and the corresponding reconstructed image.

In at least one embodiment, the comparison module 113 calculating a total error according to the reconstruction error of the target image and the corresponding estimated probability includes: acquiring pixels in the reconstructed image as first pixels, and calculating a first number of the first pixels; acquiring pixels in the target image as second pixels; comparing each first pixel with the corresponding second pixel; determining pixels in the first pixels that are different from the corresponding second pixel as target pixels; calculating a second number of the target pixels; dividing the second number by the first number and obtaining the reconstruction error.

Through the above embodiments, the reconstruction error of each target image can be accurately calculated.

The determination module 114 calculates a total error according to the reconstruction error of each target image and the corresponding estimated probability, and determines a detection result according to the total error of each target image and a corresponding preset threshold.

In at least one embodiment, the detection result can include flaws being found in the to-be-detected image and no flaws being found in the to-be-detected image.

In at least one embodiment, the determination module 114 calculating a total error according to the reconstruction error of each target image and the corresponding estimated probability includes: obtaining a preset first weighting corresponding to the estimated probability; obtaining a preset second weighting corresponding to the reconstruction error; multiplying each estimated probability by the preset first weighting to obtain a first value; multiplying each reconstruction error by the preset second weighting to obtain a second value; adding the first value and the second value to obtain the total error.

A sum of the preset first weighting and the preset second weighting is 1.

Through the above embodiment, the total error of each target image can be quickly calculated.

In at least one embodiment, the determination module 114 determining a detection result according to the total error of each target image and a corresponding preset threshold includes: determining a minimum preset threshold from a plurality of the preset thresholds; if each total error is less than the minimum preset threshold, determining the detection result as flawless being found in the to-be-detected image; if any total error is greater than or equal to the corresponding preset threshold, determining the detection result as flaws being found in the to-be-detected image; if each total error is less than the corresponding preset threshold, but any total error is greater than or equal to the minimum preset threshold, determining the detection result as flaws being found in the to-be-detected image.

In at least one embodiment, when the to-be-detected image reveals a defect, the generation module 122 generates reminder information according to the to-be-detected image, and sends the reminder information to a terminal device of a designated contact.

By performing size conversion on the to-be-detected image, changes in types of defects at various scales can be covered, and an accuracy of defect detection can be improved.

The embodiment also provides a non-transitory readable storage medium having computer-readable instructions stored therein. The computer-readable instructions are executed by a processor to implement the steps in the above-mentioned method for detecting defects in multi-scale images, such as in steps in blocks S10-S15 shown in FIG. 1:

In block S10, in response to a defect detection request, acquiring a to-be-detected image from the defect detection request;

In block S11, converting the to-be-detected image into a plurality of target images according to a plurality of preset sizes;

In block S12, performing feature extraction on each target image by using a pre-trained encoder to obtain a latent vector;

In block S13, inputting the latent vector of each target image into a decoder corresponding to the encoder to obtain a reconstructed image, and inputting the latent vector of each target image into a pre-trained Gaussian mixture model to obtain an estimated probability;

In block S14, calculating a reconstruction error according to each target image and the corresponding reconstructed image;

In block S15, calculating a total error according to the reconstruction error of each target image and the corresponding estimated probability, and determining a detection result according to the total error of each target image and a corresponding preset threshold.

The computer-readable instructions are executed by the processor to realize the functions of each module/unit in the above-mentioned device embodiments, such as the modules 110-122 in FIG. 2

Figure 3:
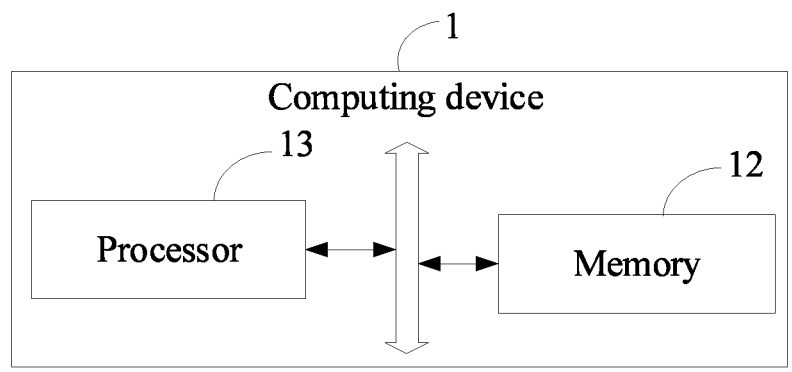
FIG. 3 shows a schematic structural diagram of a computing device applying the method for detecting defects in multi-scale images in an embodiment of the present disclosure.

FIG. 3 is a schematic structural diagram of a computing device provided in an embodiment of the present disclosure. The computing device 1 may include: a memory 12, at least one processor 13, and computer-readable instructions stored in the memory 12 and executable on the at least one processor 13, for example, image recognition programs. The processor 13 executes the computer-readable instructions to implement the steps in the embodiment of the method for detecting defects in multi-scale images, such as in steps in block S10-S15 shown in FIG. 1. Alternatively, the processor 13 executes the computer-readable instructions to implement the functions of the modules/units in the foregoing device embodiments, such as the modules 110-122 in FIG. 2.

For example, the computer-readable instructions can be divided into one or more modules/units, and the one or more modules/units are stored in the memory 12 and executed by the at least one processor 13. The one or more modules/units can be a series of computer-readable instruction segments capable of performing specific functions, and the instruction segments are used to describe execution processes of the computer-readable instructions in the computing device 1. For example, the computer-readable instruction can be divided into the extraction module 110, the conversion module 111, the input module 112, the comparison module 113, the determination module 114, the acquisition module 115, the processing module 116, the division module 117, the training module 118, the test module 119, the optimization module 120, the calculation module 121, and the generation module 122 as in FIG. 2.

The computing device 1 can be a computing device such as a desktop computer, a notebook, a palmtop computer, and a cloud server. Those skilled in the art will understand that the schematic diagram 3 is only an example of the computing device 1 and does not constitute a limitation on the computing device 1. Another computing device 1 may include more or fewer components than shown in the figures or may combine some components or have different components. For example, the computing device 1 may further include an input/output device, a network access device, a bus, and the like.

The at least one processor 13 can be a central processing unit (CPU), or can be another general-purpose processor, digital signal processor (DSPs), application-specific integrated circuit (ASIC), Field-Programmable Gate Array (FPGA), another programmable logic device, discrete gate, transistor logic device, or discrete hardware component, etc.

The processor 13 can be a microprocessor or any conventional processor. The processor 13 is a control center of the computing device 1 and connects various parts of the entire computing device 1 by using various interfaces and lines.

The memory 12 can be configured to store the computer-readable instructions and/or modules/units. The processor 13 may run or execute the computer-readable instructions and/or modules/units stored in the memory 12 and may call up data stored in the memory 12 to implement various functions of the computing device 1. The memory 12 mainly includes a storage program area and a storage data area. The storage program area may store an operating system, and an application program required for at least one function (such as a sound playback function, an image playback function, etc.), etc. The storage data area may store data (such as audio data, phone book data, etc.) created according to the use of the computing device 1. In addition, the memory 12 may include a high-speed random access memory, and may also include a non-transitory storage medium, such as a hard disk, an internal memory, a plug-in hard disk, a smart media card (SMC), a secure digital (SD) Card, a flashcard, at least one disk storage device, a flash memory device, or another non-transitory solid-state storage device.

When the modules/units integrated into the computing device 1 are implemented in the form of software functional units having been sold or used as independent products, they can be stored in a non-transitory readable storage medium. Based on this understanding, all or part of the processes in the methods of the above embodiments implemented by the present disclosure can also be completed by related hardware instructed by computer-readable instructions. The computer-readable instructions can be stored in a non-transitory readable storage medium. The computer-readable instructions, when executed by the processor, may implement the steps of the foregoing method embodiments. The computer-readable instructions include computer-readable instruction codes, and the computer-readable instruction codes can be in a source code form, an object code form, an executable file, or some intermediate form. The non-transitory readable storage medium can include any entity or device capable of carrying the computer-readable instruction code, such as a recording medium, a U disk, a mobile hard disk, a magnetic disk, an optical disk, a computer memory, or a read-only memory (ROM).

In the several embodiments provided in the preset disclosure, the disclosed computing device and method can be implemented in other ways. For example, the embodiments of the devices described above are merely illustrative. For example, divisions of the units are only logical function divisions, and there can be other manners of division in actual implementation.

In addition, each functional unit in each embodiment of the present disclosure can be integrated into one processing unit, or can be physically present separately in each unit or two or more units can be integrated into one unit. The above modules can be implemented in a form of hardware or in a form of a software functional unit.

The present disclosure is not limited to the details of the above-described exemplary embodiments, and the present disclosure can be embodied in other specific forms without departing from the spirit or essential characteristics of the present disclosure. Therefore, the present embodiments are to be considered as illustrative and not restrictive, and the scope of the present disclosure is defined by the appended claims. All changes and variations in the meaning and scope of equivalent elements are included in the present disclosure. Any reference sign in the claims should not be construed as limiting the claim. Furthermore, the word "comprising" does not exclude other units nor does the singular exclude the plural. A plurality of units or devices stated in the system claims may also be implemented by one unit or device through software or hardware. Words such as "first" and "second" are used to indicate names, but not in any particular order.

Finally, the above embodiments are only used to illustrate technical solutions of the present disclosure and are not to be taken as restrictions on the technical solutions. Although the present disclosure has been described in detail with reference to the above embodiments, those skilled in the art should understand that the technical solutions described in one embodiment can be modified, or some of the technical features can be equivalently substituted, and that these modifications or substitutions are not to detract from the essence of the technical solutions or from the scope of the technical solutions of the embodiments of the present disclosure.

What is claimed is:

1. A method for detecting defects in multi-scale images, the method comprising:
   in response to a defect detection request, acquiring a to-be-detected image from the defect detection request;
   converting the to-be-detected image into a plurality of target images according to a plurality of preset sizes;
   performing feature extraction on each target image by using a pre-trained encoder to obtain a latent vector;
   inputting the latent vector of each target image into a decoder corresponding to the encoder to obtain a reconstructed image, and inputting the latent vector of each target image into a pre-trained Gaussian mixture model to obtain an estimated probability;
   calculating a reconstruction error according to each target image and the corresponding reconstructed image;
   calculating a total error according to the reconstruction error of each target image and the corresponding estimated probability; and
   determining a detection result according to the total error of each target image and a corresponding preset threshold.

2. The method for detecting defects in multi-scale images according to claim 1, wherein acquiring a to-be-detected image from the defect detection request comprises:
   obtaining an idle thread from a preset thread connection pool;
   parsing a method body of the defect detection request through the idle thread and obtaining a plurality of information carried in the defect detection request;
   acquiring a preset label; and
   extracting information corresponding to the preset label from the plurality of information as to the to-be-detected image.

3. The method for detecting defects in multi-scale images according to claim 1, wherein converting the to-be-detected image into a plurality of target images according to a plurality of preset sizes comprises:
   detecting a target object in the to-be-detected image;
   segmenting an area corresponding to the target object and obtaining an area image; and
   converting the area image according to the plurality of preset sizes and obtaining the plurality of target images.

4. The method for detecting defects in multi-scale images according to claim 1, wherein performing feature extraction on each target image by using a pre-trained encoder to obtain a latent vector comprises:
   performing an encoding process on each target image and obtaining a feature vector;
   calculating the feature vector through a plurality of hidden layers of the encoder; and
   determining an output vector of a final hidden layer as the latent vector.

5. The method for detecting defects in multi-scale images according to claim 1, before inputting the latent vector of each target image into a pre-trained Gaussian mixture model, the method further comprising:
   acquiring a plurality of training images;
   encoding the plurality of training images to obtain a plurality of coding vectors;
   performing a dimensionality reduction and a normalization processing on the plurality of coding vectors to obtain a plurality of low-dimensional vectors;
   dividing the plurality of low-dimensional vectors into a training set, a test set, and a verification set;
   based on a maximum expectation algorithm, iteratively training the training set to obtain a learner;
   testing the learner with the test set to obtain a test result; and
   if the test result is less than a configured value, optimizing parameters of the learner with the verification set to obtain the Gaussian mixture model.

6. The method for detecting defects in multi-scale images according to claim 1, wherein calculating a total error according to the reconstruction error of each target image and the corresponding estimated probability comprises:
   acquiring pixels in the reconstructed image as first pixels, and calculating a first number of the first pixels;
   acquiring pixels in the target image as second pixels;
   comparing each first pixel with the corresponding second pixel;
   determining pixels in the first pixels that are different from the corresponding second pixel as target pixels;
   calculating a second number of the target pixels;
   dividing the second number by the first number; and
   obtaining the reconstruction error.

7. The method for detecting defects in multi-scale images according to claim 1, wherein determining a detection result according to the total error of each target image and a corresponding preset threshold comprises:
   determining a minimum preset threshold from a plurality of the preset thresholds;
   if each total error is less than the minimum preset threshold, determining the detection result as flawless being found in the to-be-detected image;
   if any total error is greater than or equal to the corresponding preset threshold, determining the detection result as flaws being found in the to-be-detected image; and
   if each total error is less than the corresponding preset threshold, but any total error is greater than or equal to the minimum preset threshold, determining the detection result as flaws being found in the to-be-detected image.

8. A computing device comprising a memory and a processor, the memory stores at least one computer-readable instruction, which when executed by the processor causes the processor to:
   in response to a defect detection request, acquire a to-be-detected image from the defect detection request;
   convert the to-be-detected image into a plurality of target images according to a plurality of preset sizes;
   perform feature extraction on each target image by using a pre-trained encoder to obtain a latent vector;

input the latent vector of each target image into a decoder corresponding to the encoder to obtain a reconstructed image, and input the latent vector of each target image into a pre-trained Gaussian mixture model to obtain an estimated probability;

calculate a reconstruction error according to each target image and the corresponding reconstructed image;

calculate a total error according to the reconstruction error of each target image and the corresponding estimated probability; and determine a detection result according to the total error of each target image and a corresponding preset threshold.

9. The computing device according to claim 8, wherein the processor acquires a to-be-detected image from the defect detection request comprises:

obtain an idle thread from a preset thread connection pool;

parse a method body of the defect detection request through the idle thread and obtain a plurality of information carried in the defect detection request;

acquire a preset label; and extract information corresponding to the preset label from the plurality of information as to the to-be-detected image.

10. The computing device according to claim 8, wherein the processor converts the to-be-detected image into a plurality of target images according to a plurality of preset sizes comprises:

detect a target object in the to-be-detected image;

segment an area corresponding to the target object and obtaining an area image; and convert the area image according to the plurality of preset sizes and obtaining the plurality of target images.

11. The computing device according to claim 8, wherein the processor performs feature extraction on each target image by using a pre-trained encoder to obtain a latent vector comprises:

perform an encoding process on each target image and obtaining a feature vector;

calculate the feature vector through a plurality of hidden layers of the encoder; and determine an output vector of a final hidden layer as the latent vector.

12. The computing device according to claim 8, wherein the processor is further caused to:

acquire a plurality of training images before input the latent vector of each target image into a pre-trained Gaussian mixture model;

encode the plurality of training images to obtain a plurality of coding vectors;

perform a dimensionality reduction and a normalization processing on the plurality of coding vectors to obtain a plurality of low-dimensional vectors;

divide the plurality of low-dimensional vectors into a training set, a test set, and a verification set;

based on a maximum expectation algorithm, iteratively train the training set to obtain a learner;

test the learner with the test set to obtain a test result; and if the test result is less than a configured value, optimize parameters of the learner with the verification set to obtain the Gaussian mixture model.

13. The computing device according to claim 8, wherein the processor calculates a total error according to the reconstruction error of each target image and the corresponding estimated probability comprises:

acquire pixels in the reconstructed image as first pixels, and calculating a first number of the first pixels;

acquire pixels in the target image as second pixels;

compare each first pixel with the corresponding second pixel;

determine pixels in the first pixels that are different from the corresponding second pixel as target pixels;

calculate a second number of the target pixels;

divide the second number by the first number; and obtain the reconstruction error.

14. The computing device according to claim 8, wherein the processor determines a detection result according to the total error of each target image and a corresponding preset threshold comprises:

determining a minimum preset threshold from a plurality of the preset thresholds;

if each total error is less than the minimum preset threshold, determine the detection result as flawless being found in the to-be-detected image;

if any total error is greater than or equal to the corresponding preset threshold, determine the detection result as flaws being found in the to-be-detected image; and if each total error is less than the corresponding preset threshold, but any total error is greater than or equal to the minimum preset threshold, determine the detection result as flaws being found in the to-be-detected image.

15. A non-transitory storage medium having at least one computer-readable instruction stored thereon, when the at least one computer-readable instruction is executed by a processor to implement a method for detecting defects in multi-scale images, the method comprises:

in response to a defect detection request, acquiring a to-be-detected image from the defect detection request;

converting the to-be-detected image into a plurality of target images according to a plurality of preset sizes;

performing feature extraction on each target image by using a pre-trained encoder to obtain a latent vector;

inputting the latent vector of each target image into a decoder corresponding to the encoder to obtain a reconstructed image, and inputting the latent vector of each target image into a pre-trained Gaussian mixture model to obtain an estimated probability;

calculating a reconstruction error according to each target image and the corresponding reconstructed image;

calculating a total error according to the reconstruction error of each target image and the corresponding estimated probability; and determining a detection result according to the total error of each target image and a corresponding preset threshold.

16. The non-transitory storage medium according to claim 15, wherein acquiring a to-be-detected image from the defect detection request comprises:

obtaining an idle thread from a preset thread connection pool;

parsing a method body of the defect detection request through the idle thread and obtaining a plurality of information carried in the defect detection request;

acquiring a preset label; and extracting information corresponding to the preset label from the plurality of information as to the to-be-detected image.

17. The non-transitory storage medium according to claim 15, wherein converting the to-be-detected image into a plurality of target images according to a plurality of preset sizes comprises:

detecting a target object in the to-be-detected image;

segmenting an area corresponding to the target object and obtaining an area image;

converting the area image according to the plurality of preset sizes; and obtaining the plurality of target images.

18. The non-transitory storage medium according to claim 15, wherein performing feature extraction on each target image by using a pre-trained encoder to obtain a latent vector comprises:

performing an encoding process on each target image and obtaining a feature vector;

calculating the feature vector through a plurality of hidden layers of the encoder; and determining an output vector of a final hidden layer as the latent vector.

19. The non-transitory storage medium according to claim 15, wherein calculating a total error according to the reconstruction error of each target image and the corresponding estimated probability comprises:

acquiring pixels in the reconstructed image as first pixels, and calculating a first number of the first pixels;

acquiring pixels in the target image as second pixels;

comparing each first pixel with the corresponding second pixel;

determining pixels in the first pixels that are different from the corresponding second pixel as target pixels;

calculating a second number of the target pixels;

dividing the second number by the first number; and obtaining the reconstruction error.

20. The non-transitory storage medium according to claim 15, wherein determining a detection result according to the total error of each target image and a corresponding preset threshold comprises:

determining a minimum preset threshold from a plurality of the preset thresholds;

if each total error is less than the minimum preset threshold, determining the detection result as flawless being found in the to-be-detected image;

if any total error is greater than or equal to the corresponding preset threshold, determining the detection result as flaws being found in the to-be-detected image; and if each total error is less than the corresponding preset threshold, but any total error is greater than or equal to the minimum preset threshold, determining the detection result as flaws being found in the to-be-detected image.

* * * * *